Jan. 11, 1938.  G. P. ROBERTS  2,105,299
BRAKE
Filed Oct. 16, 1936

INVENTOR.
GLYN PIERCE ROBERTS
BY
n. D. Parker Jr.
ATTORNEY.

Patented Jan. 11, 1938

2,105,299

UNITED STATES PATENT OFFICE 2,105,299

BRAKE

Glyn Pierce Roberts, Birmingham, England, assignor to Bendix Products Corporation, South Bend, Ind., a corporation of Indiana Application October 16, 1936, Serial No. 106,025
In Great Britain October 18, 1935

1 Claim. (Cl. 188—195)

This invention relates to an improved device for limiting the load which can be applied to a movable member, such as a member for operating the brakes of a vehicle, and more particularly to means for rapid adjustment of such a device as is described and claimed in my copending application Serial No. 78,207, filed May 1, 1936.

The above mentioned application shows a device which permits equalized application of four wheel brakes up to a certain predetermined limit, beyond which additional applying force is transmitted only to the front brakes. This is intended to prevent skidding of the rear wheels due to the shifting of the weight of the vehicle during deceleration. Since the passenger or weight load of a vehicle often represents a large proportion of the gross weight it has been found that different limits of rear wheel braking load are desirable when a vehicle is loaded and when unloaded.

An object of the invention is to provide external, easily operable means for varying the effect of a vehicle brake load limiting device.

Another object of the invention is to provide means, readily accessible to the driver of a vehicle, for varying the effect of a vehicle brake load limiting device to correspond to a loaded or unloaded condition of the vehicle.

Figure 1:
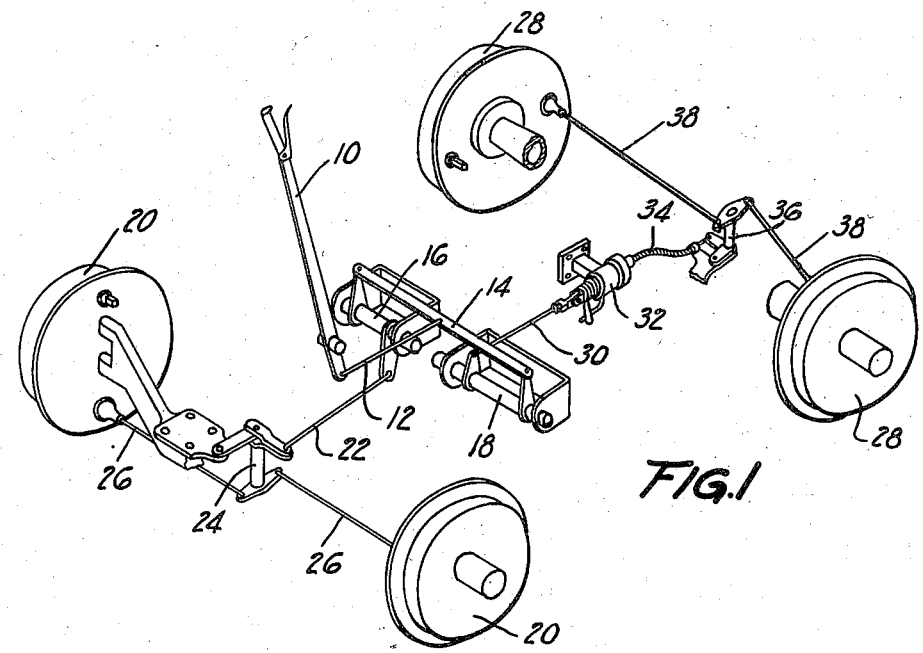
Figure 2:
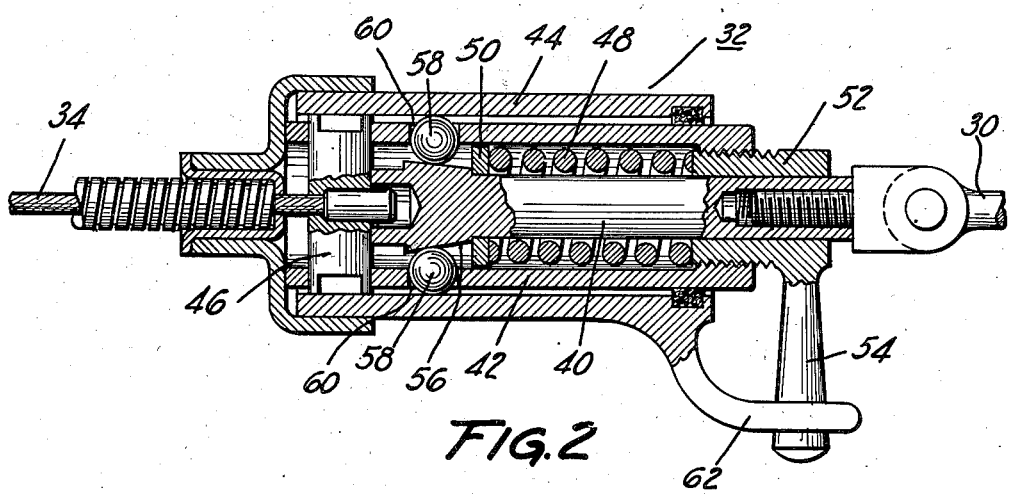

Other objects and desirable particular constructions will be apparent by reference to the following detailed description of an illustrative embodiment of my invention shown in the accompanying drawing, in which:

Figure 1 is a partially diagrammatic view of a vehicle brake system employing my invention; and Figure 2 is a longitudinal section through the load limiting device employed in the system of Figure 1.

The illustrated brake system may be operated by any desirable means such as a hand lever 10 having extending therefrom a tension member 12 engaging an equalizer bar 14. The equalizer bar is adapted to rotate a pair of coaxial cross-shafts 16 and 18. Shaft 16 operates the front brakes 20 through a tension member 22, a vertical shaft 24 and tension members 26. The shaft 18 operates the rear brakes 28 through a tension member 30, the novel load limiting device 32, a Bowden cable and conduit 34 operatively engaging a vertical shaft 36, and tension members 38.

Referring to Figure 2 illustrating in detail one form of my invention, the tension member 30 from the cross-shaft 18 is connected to the forward end of a plunger 40 which is axially slidable in a sleeve 42. The sleeve 42 is in turn axially slidable in a housing 44. The Bowden cable 34 is connected to the sleeve 42 by a pin 46 journaled in the rear end of the sleeve.

The rear end of a coiled compression spring 48 engages a washer 50 abutting a shoulder on the plunger 40 and the forward end of the spring engages a sleeve or bushing 52 adjustably threaded in the forward end of the sleeve 42. An arm 54 or any other suitable means for rotation of the sleeve 52 is provided thereon and is preferably made accessible to the driver through an opening in the floor-board (not shown) of the vehicle, although remote operating means mounted, e. g. on the dashboard of the vehicle, might be employed.

The plunger 40 is held against the pin 46 by the spring 48 so that the plunger 40 and the sleeve 42 occupy fixed relative positions as long as the spring force is not exceeded.

The rear end of the plunger 40 is formed with a conical surface 56 and engaging this surface are a plurality of rolls 58 loosely held in slots 60 in the sleeve 42. In inoperative position these rolls are positioned just out of contact with the housing 44.

In operation, when the brakes are applied, the movement of the hand lever 10 transmits equal forces to the tension members 22 and 30. The force in the member 30 is transmitted to the plunger 40 and thence through the spring, to the sleeve 42 and Bowden cable 34 and all these members move together to apply the rear brakes equally with the front brakes. But if the brakes are applied very hard, the forces transmitted will exceed the force of the spring and the plunger 40 will move forwardly relatively to the sleeve 42, compressing the spring, forcing the rolls 58 into contact with the housing 44 and locking the plunger against further movement.

Additional force on the hand lever 10 swings the equalizer bar 14 and effects only the front brakes 20.

As above stated, it is desirable to vary the limit of the amount of force transmitted to the rear brakes when the vehicle is differently loaded and it may be desirable also to change the limit for different road surfaces or during wet weather. These variations are accomplished by rotating the threaded sleeve 52 by means of the handle 54 and thus increasing or decreasing the compression of the spring 48.

When it is desired only to vary the spring force between two limits corresponding to completely loaded and unloaded conditions of the vehicle, it is desirable to provide a stop such as the tongue 62 secured to the housing 44 which, by engaging the lever 54, prevents the sleeve 52 from being rotated more than approximately one revolution. By properly proportioning the pitch of the thread on the sleeve 52 the range of adjustment may be adapted to any particular vehicle. It may also be desirable to employ some form of spring detent capable of holding the sleeve 52 and lever 54 in any one of several intermediate positions.

While only one embodiment of my invention has been described in detail it is to be understood that many variations of form and arrangement might be made within the scope of the inventive idea, and consequently, it is not my intention to be limited by that embodiment or otherwise than by the terms of the appended claim.

I claim:

A load limiting device for a vehicle brake comprising a plunger, a sleeve, a housing, a second sleeve adjustably threaded in the first sleeve, a spring effectively interposed between the plunger and the second sleeve, wedging elements, said plunger having means operated by relative movement between said plunger and said sleeves for engaging said wedging elements with said housing to lock the plunger thereto, said second sleeve having means for shifting it to either of two positions giving different spring actions, and said housing being provided with a projection forming a stop for said last named means permitting it to be moved between said two positions corresponding to loaded and unloaded condition of the vehicle.

GLYN PIERCE ROBERTS.